US 6,715,972 B2

(12) United States Patent
Jackson, Sr.

(10) Patent No.: US 6,715,972 B2
(45) Date of Patent: Apr. 6, 2004

(54) RIGID TIE-DOWN DEVICE FOR SECURING A TWO-WHEELED VEHICLE

(76) Inventor: Rueben Dale Jackson, Sr., 6500 Jones Rd., College Park, GA (US) 30349-1569

( * ) Notice: Subject to any disclaimer, the term of this patent is extended or adjusted under 35 U.S.C. 154(b) by 165 days.

(21) Appl. No.: 10/059,285

(22) Filed: Jan. 28, 2002

(65) Prior Publication Data

US 2003/0143051 A1 Jul. 31, 2003

Related U.S. Application Data

(60) Provisional application No. 60/266,422, filed on Feb. 3, 2001.

(51) Int. Cl.[7] .................................................. B60P 7/08
(52) U.S. Cl. ................................ 410/97; 410/3; 410/7
(58) Field of Search ............................... 410/2, 3, 7, 23, 410/96, 97; 224/534, 568, 535, 569, 924; 248/499

(56) References Cited

U.S. PATENT DOCUMENTS

| | | | | |
|---|---|---|---|---|
| 1,783,102 A | * | 11/1930 | Tucker et al. | |
| 5,326,202 A | * | 7/1994 | Stubbs | 410/3 |
| 5,529,448 A | * | 6/1996 | Kosma | 410/97 |
| 6,065,914 A | * | 5/2000 | Fotou | 410/3 |
| 6,099,219 A | * | 8/2000 | Bartholomay | 410/20 |
| 6,139,235 A | * | 10/2000 | Vander Koy et al. | 410/111 |
| 6,171,034 B1 | * | 1/2001 | Burgoon et al. | 410/3 |
| 6,331,094 B1 | * | 12/2001 | Burrows | 410/30 |
| 6,382,891 B1 | * | 5/2002 | Bellis, Jr. | 410/7 |
| 6,524,041 B1 | * | 2/2003 | Voiculesseu | 410/100 |

* cited by examiner

Primary Examiner—Stephen T. Gordon

(57) ABSTRACT

A non-compressing device for securing a two-wheeled vehicle to a towing apparatus has a triangular shaped structure with a base and two legs, the two legs attach to the base to form a triangle. The base of triangular shaped structure is then attached to the towing apparatus. A clamp is attached to the legs of the triangular shaped structure. Alternately, a T-shaped structure has a foot and pedestal and is attached to the towing apparatus. Retractable legs and a foldable base of the triangular shaped structure for the purpose of storing or transporting when not in use or detaching the foot from the pedestal on the T-shaped structure for the purpose of storing or transporting when not in use may be included.

3 Claims, 6 Drawing Sheets

A)

B)

A)

RIGID TIE-DOWN DEVICE FOR SECURING A TWO-WHEELED VEHICLE

This application is based on a Provisional Application Ser. No. 60/266,422 filed on Feb. 3, 2001.

BACKGROUND OF THE INVENTION

This invention relates generally to the field of tie down devices, and more particularly to a device for securing a two-wheeled vehicle to a towing apparatus.

Rigid or structural securing devices have been primarily used to support motorcycles for display purposes and not for towing purposes. The rigid structural devices that are used to support motorcycles are small and usually mount to the lower portion of the frame of the motorcycle to keep the device as inconspicuous as possible. This positioning, low on the frame, does not provide the strength and stability necessary for towing purposes.

Conventional strap tie-downs, usually made of synthetic or natural materials, are not rigid. These strap tie-downs operate simply by attaching each end of a pair of straps to opposing sides of the motorcycle and attaching the other ends of the straps to the towing apparatus. If you attach the tie-down to the handlebar of the motorcycle, both straps are recommended to be attached at the same point (and on opposite sides of the motorcycle) and equal tension is applied to the straps. If you attach the tie-downs to any other part of the motorcycle another strap must be attached to the opposite side of the motorcycle and equal tension must be applied to each strap.

Strap tie-downs operate by applying tension in one direction. This usually means that if strap tie-downs are used to secure a motorcycle for towing purposes, the tension must be applied in a downward direction. The tension applied to the tie-downs must be equal and opposite and if either tie-down fails, the other fails because the tension is relieved, causing the motorcycle to fall because the remaining tie-down is pulling in only one direction. The tension applied on the motorcycle by the use of conventional strap tie downs causes the motorcycle's suspension to be compressed. Sustained compression of the suspension can cause damage to the springs, called "memory loss". This memory loss results when the springs lose their ability to properly rebound to their original uncompressed position. This damage to the springs alters the handling and safety of the motorcycle. Another problem caused by prolonged compression of the suspension is damage to the motorcycle's shock seals. Many modern motorcycles no longer have frame members exposed to attach a conventional tie-down. These motorcycles have aerodynamic fairing bodywork that covers the frame of the motorcycle and as a result, the only place that a tie-down can usually be attached is the handlebars. The handlebars are not designed to have sustained tension or compression applied to them, such as that which is required when using conventional strap tie downs. Tie downs can also be attached to lower frame members such as a crash bar, however, because of the lower position of the crash bar there is very little mechanical advantage of leverage. Many crash bars are designed to have force applied in an upward and not downward direction and therefore could be damaged by the tension applied by conventional strap tie-downs.

BRIEF SUMMARY OF THE INVENTION

An object of the invention is to provide a non-compressing method of securing two wheeled motor vehicles to a towing apparatus.

Another object of the invention is to provide greater safety in securing a two-wheeled motor vehicle to a towing apparatus.

A further object of the invention is to provide ant-theft benefits when towing a two-wheeled motor vehicle.

In accordance with a preferred embodiment of the present invention, a device for securing a two-wheeled vehicle to a towing apparatus comprises a rigid, triangular-shaped structure having a base and two legs, a means to secure the two legs to the base, and a means to secure the base to the towing apparatus. The device is further comprised of adjustable legs and adjustable clamps that can be attached to the handlebar grips of the two-wheeled motor vehicle so that the device effectively forms a rigid support for the two-wheeled motor vehicle when the vehicle is being towed. The device can be folded or reduced in size when not in use.

An alternate shape is a T-shaped structure comprising a foot and a pedestal, a clamp and a means to secure the clamp to the pedestal, a means to secure the pedestal to the foot, and a means to secure the foot to the towing apparatus. The pedestal can be removed from the foot when not in use, can be adjusted in height and also has adjustable clamps. The device effectively forms a rigid support for the two-wheeled motor vehicle when the vehicle is being towed.

A non-compressing rigid structure applies no force at the point, which it is attached to the motorcycle, such as the handlebar grips. The rigid structure effectively cradles the motorcycle and prevents movement up or down, fore or aft. Each structure can operate independent of the other structure although two are recommended during towing. Since no compression of the suspension is necessary to secure the motorcycle, no compression damage to the springs or shocks can result. Also, the device can be attached safely by one person. It is quick compact and simple. It folds to less than one half its size when not in use.

Other objects and advantages will become apparent from the following descriptions, taken in connection with the accompanying drawings, wherein, by way of illustration and example, an embodiment of the present invention is disclosed.

BRIEF DESCRIPTION OF THE SEVERAL DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
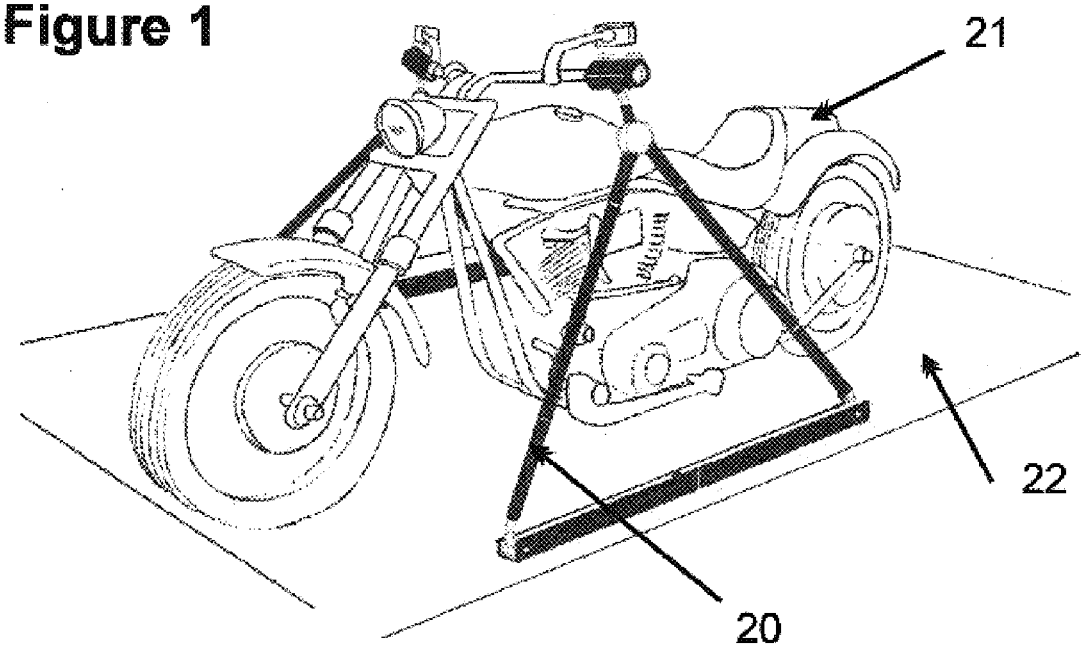
FIG. 1 is a perspective view of the triangular-shaped device in accordance with a preferred embodiment of the present invention.
Figure 2:
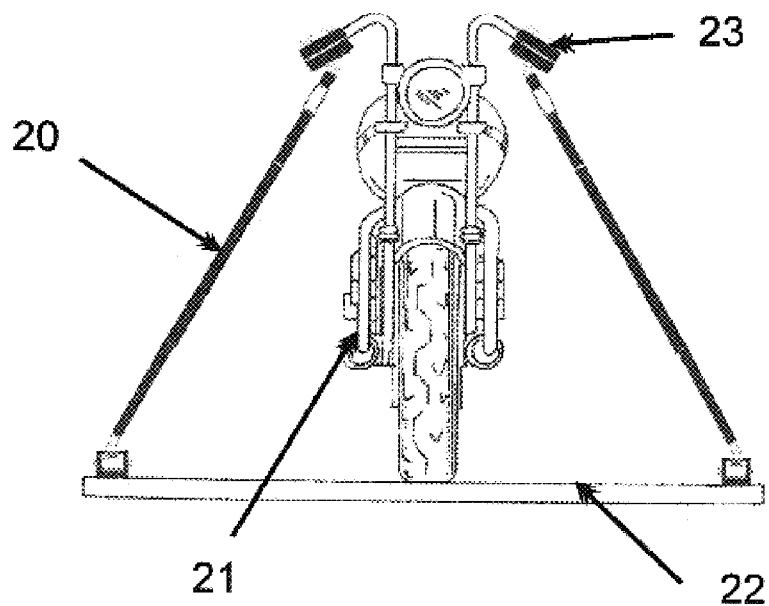
FIG. 2 is a front view of the triangular-shaped device in accordance with a preferred embodiment of the present invention.

Turning now to the drawings. FIG. 1, there is shown the perspective view of device 20 securing two-wheeled vehicle 21 to towing apparatus 22. FIG. 2 is a front view of device 20 securing two-wheeled vehicle 21 to towing apparatus 22. In the particular device illustrated the two-wheeled vehicle is secured to the towing apparatus by attaching the clamps of the device to the handlebar grips of the two-wheeled motor vehicle and attaching the base rail of the device to the towing apparatus with bolts. This device prevents the two-wheeled vehicle movement fore and aft and from tipping over on either side while the vehicle is being transported. One feature of the invention is that it folds when not in use to further reduce its size. The legs are telescoping and when fully retracted fit into the base and the base can then be folded in half Another feature is the quick attachment of the clamps to the handlebars. One important design feature is that it can be safely attached to the two-wheeled vehicle by one person. A rigid structure provides omni directional support, this eliminates the need for compressing the handlebars.

Figure 3:
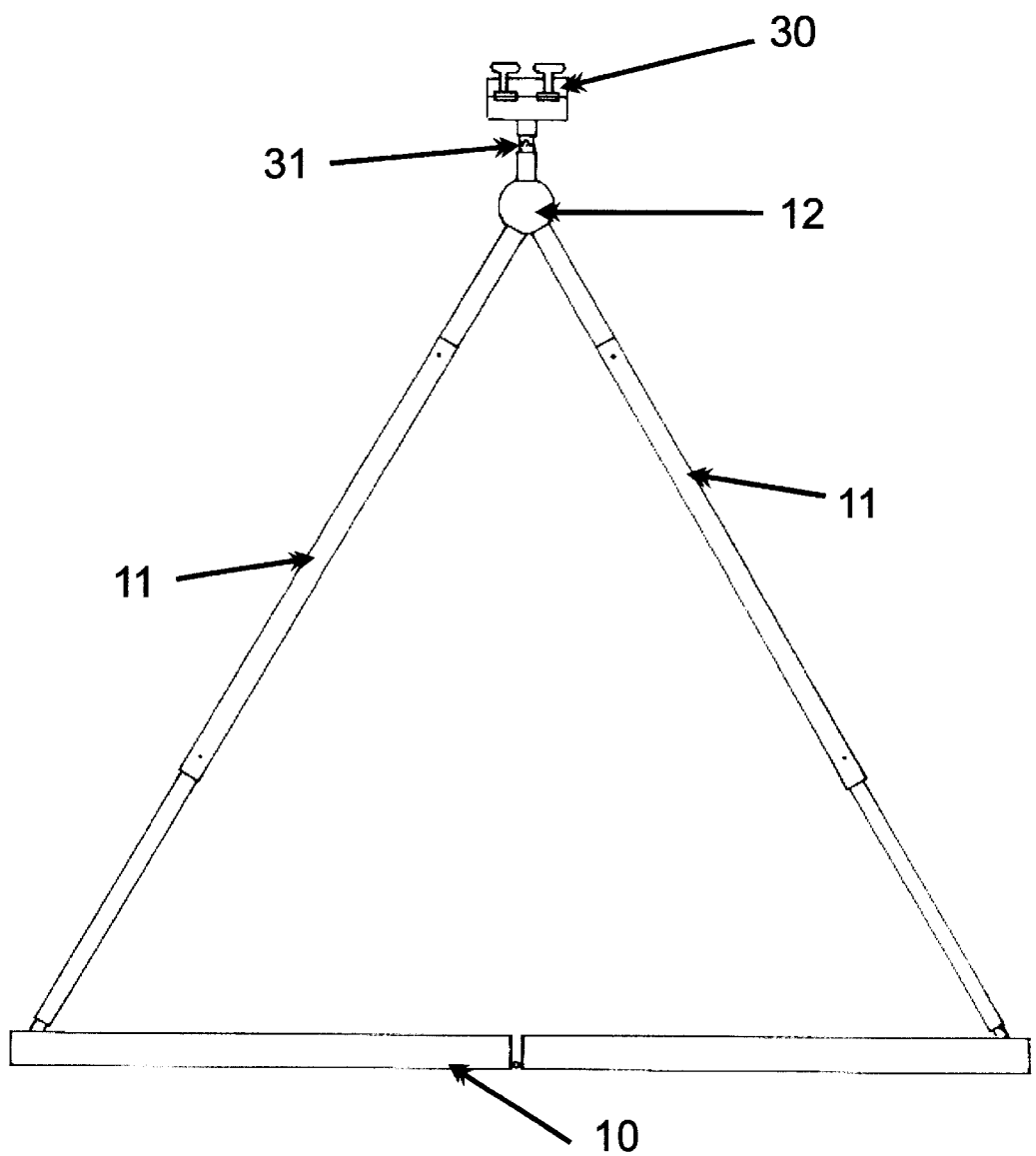
FIG. 3 is a plan view of the triangular-shaped device of FIG. 1.

Turning now to FIG. 3 the non-compressing triangular shaped device has base 10 connected to two legs 11 forming a triangle. The base is attached to the towing apparatus with bolts. At the top or vertex of the device is apex junction 12 where the two legs 11 interlock. Ball joint 31 is connected to handlebar clamp 30 at location 23. The ball joint and clamp forms an assembly that allows the clamp to be attached to-the handlebar grips regardless of the position of the handlebar grip.

Figure 4:
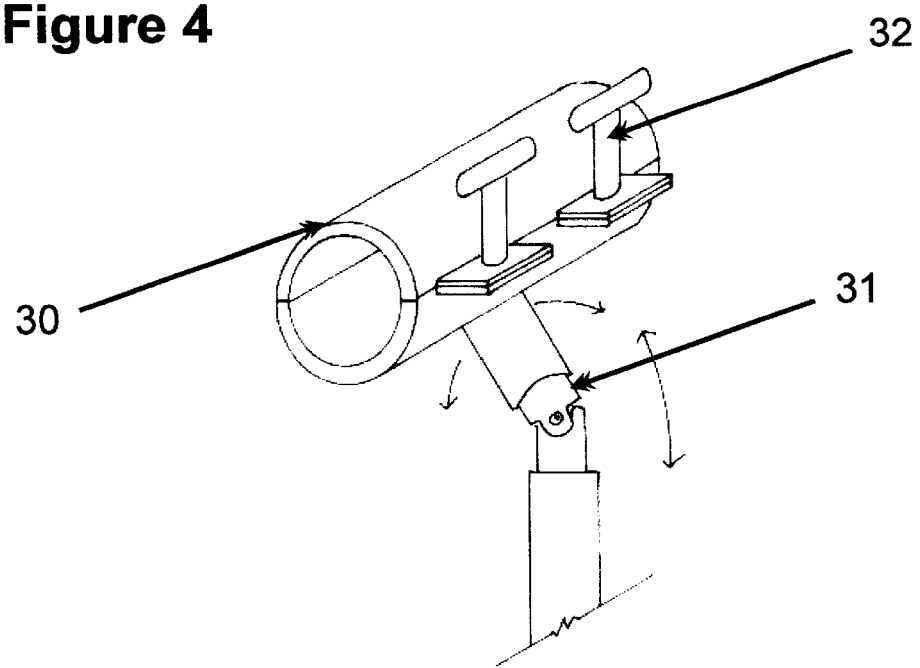
FIG. 4 is a perspective view of the handlebar clamp.
Figure 4:
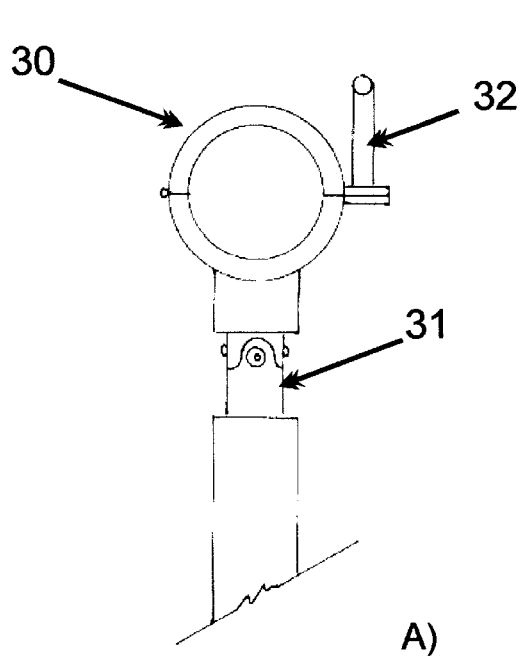
Figure 4:
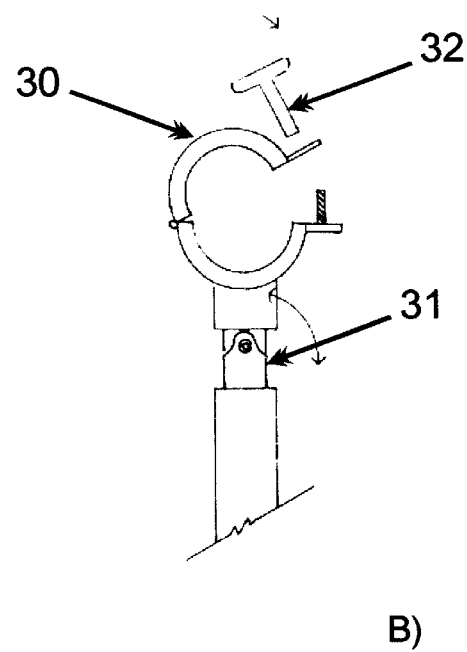

Turning now to FIG. 4(b) there is shown clamp 30 in the partially opened position and the ball joint 31 and locking nut 32 for the clamp. In FIG. 4(a) there is shown clamp 30 in the closed position, ball joint 31 and locking nuts 32 are also shown. FIG. 4(b) is an end view of the clamp 30 and the ball joint 31 and the locking nut 32. The ball joint assembly permits the clamp to be adjustable to fit various angles of different makes of two wheeled motor vehicles.

Figure 5:
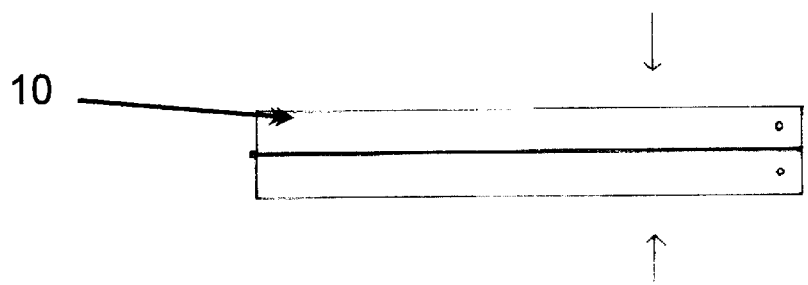
FIG. 5 is a plan view of the triangular-shaped device in the folded and retracted position.
Figure 5:
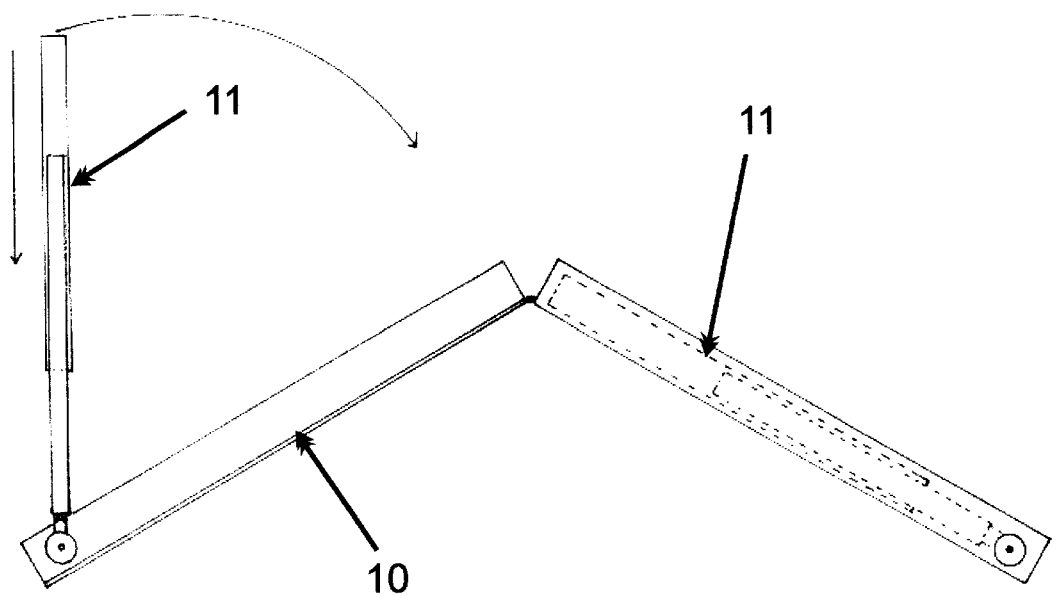
Figure 6:
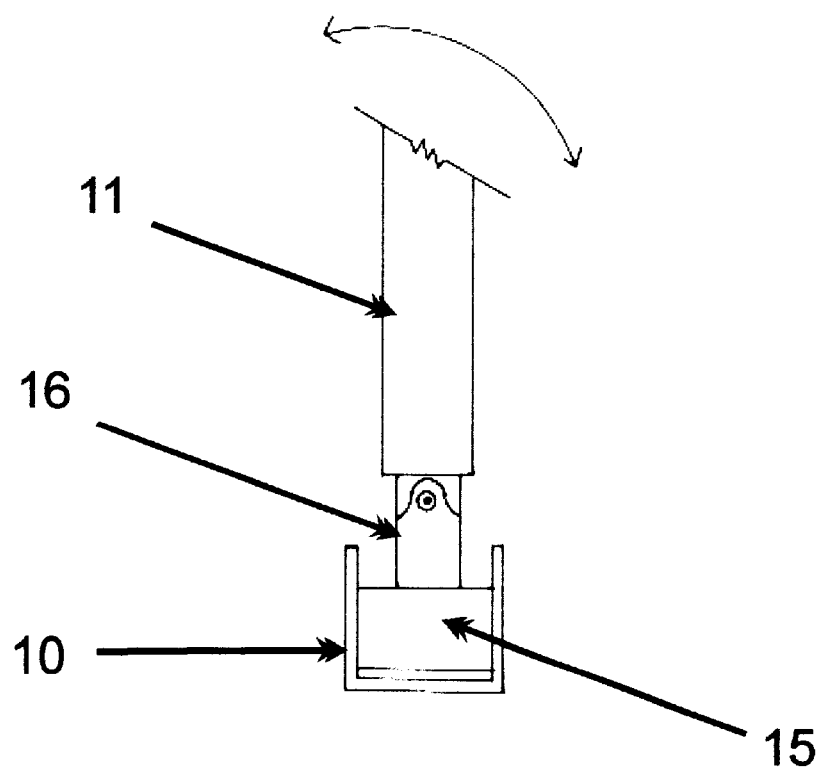
FIG. 6 is an end view of the triangular-shaped device the base rail, leg and base rail joint is shown.

Turning to FIG. 5(a), there is shown base 10 in a semi-folded position and one leg 11 partially extended from base 10 and the other leg 11 fully retracted in base 10. FIG. 5 is the base 10 in the folded position. FIG. 6 is an end view of base 10 and base swivel 15 with knee joint 16 attached to leg 11.

Figure 7:
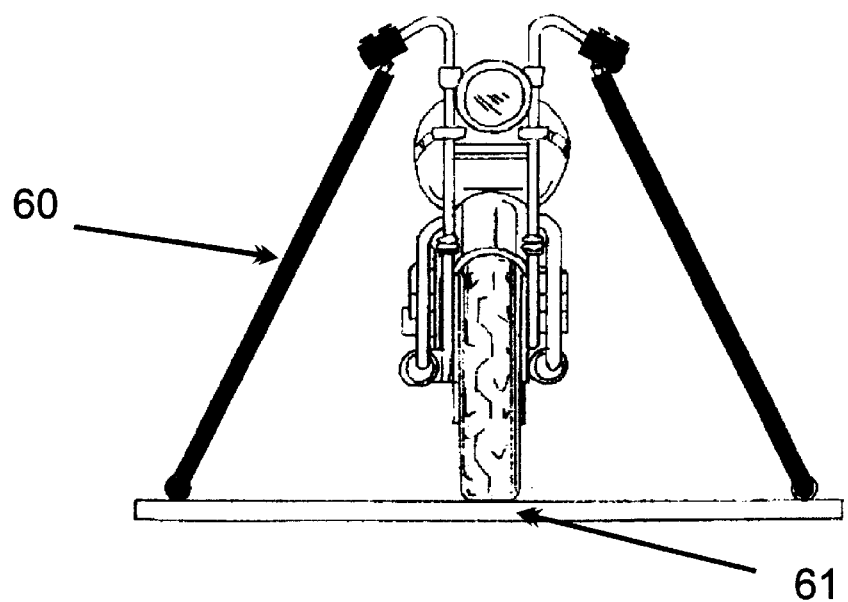
FIG. 7 is a front view of the T-shaped device in accordance with an alternate embodiment of the present invention.
Figure 8:
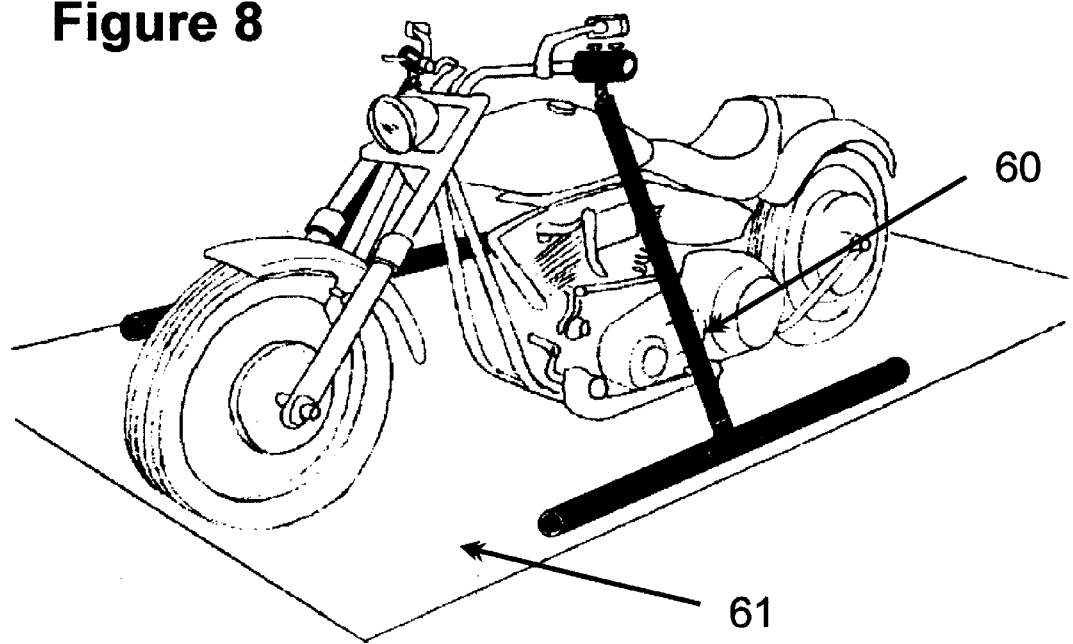
FIG. 8 is a perspective view of the T-shaped device in accordance with an alternate embodiment of the present invention.

Turning now to FIG. 7 there is shown a front view of the T-shaped non-compressing device 60 attached to the two-wheeled vehicle on the towing apparatus. 61. FIG. 8 is a side perspective view of T-shaped non-compressing device 60 attached to the two-wheeled vehicle and the towing apparatus 61.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A rigid tie-down device for securing a two-wheeled vehicle comprising:
    a rigid, triangular shaped structure comprising a base and two legs;
    a means to secure the two legs to the base; and
    a means to secure the base to the towing apparatus.

2. A rigid tie-down device for securing a two-wheeled vehicle as claimed in claim 1 further comprising a for folding the device when not in use.

3. A rigid tie-down device for securing a two-wheeled vehicle as claimed in 1 further comprising an adjustable clamp attached to the legs and wherein the legs are adjustable.

* * * * *